Nov. 20, 1956  D. G. JELATIS  2,771,199
REMOTE CONTROL MANIPULATOR

Filed April 12, 1955  9 Sheets-Sheet 1

Fig. 1

INVENTOR.
Demetrius G. Jelatis
BY
Roland A. Anderson
Attorney

Nov. 20, 1956     D. G. JELATIS     2,771,199
REMOTE CONTROL MANIPULATOR
Filed April 12, 1955     9 Sheets-Sheet 4

INVENTOR.
Demetrius G. Jelatis
BY
Roland A. Anderson
Attorney

Nov. 20, 1956     D. G. JELATIS     2,771,199
REMOTE CONTROL MANIPULATOR
Filed April 12, 1955     9 Sheets-Sheet 6

Nov. 20, 1956  D. G. JELATIS  2,771,199
REMOTE CONTROL MANIPULATOR
Filed April 12, 1955  9 Sheets-Sheet 7

INVENTOR.
Demetrius G. Jelatis
BY
Roland A. Anderson
Attorney

Fig. 11

United States Patent Office 2,771,199
Patented Nov. 20, 1956

2,771,199

REMOTE CONTROL MANIPULATOR

Demetrius G. Jelatis, Red Wing, Minn., assignor to the United States of America as represented by the United States Atomic Energy Commission Application April 12, 1955, Serial No. 501,006

6 Claims. (Cl. 214—1)

This invention relates to a remote-control manipulator of the type by which movements of a handle engaged by an operator are reproduced in a claw or grasper engaging an article to be manipulated. More specifically, the handle and grasper are connected to the lower ends of vertical master and slave arms located, respectively, in safe and dangerous areas and mounted on the ends of a horizontal support that extends through a shielding wall separating the safe and dangerous areas.

The present invention is applicable to a manipulator of the above type on which the slave arm may be angularly shifted with respect to the master arm for adjustment of the effective spacing between the arms and for alignment of the slave arm with horizontal support for insertion or withdrawal of the slave arm through the shielding wall. With this arrangement it is highly desirable for the counterweights for both master and slave arms to be located adjacent the master arm. Under the present invention one counterweight for the slave arm is located adjacent the master arm but is connected with the slave arm so as to move with the slave arm when the slave arm is adjusted with respect to the master arm.

The present invention also involves arranging the counterweights for both master and slave arms of the master arm in such a way that the portion of the master arm projecting above the horizontal support is kept to a minimum. Thus the headroom required in the safe area above the horizontal support is held at a minimum.

Other advantages and features of the present invention will be obvious from the specification and the drawings in which.

Figure 1:
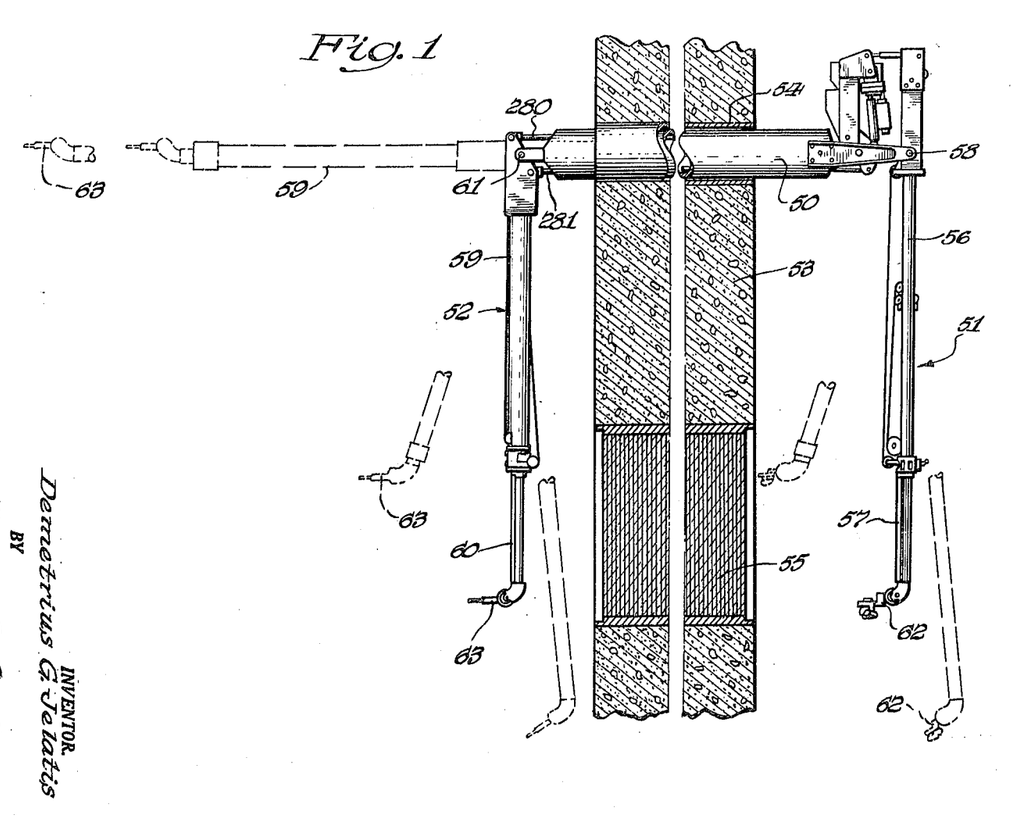
Fig. 1 is an elevational view, partly in section, showing the remote-control manipulator of the present invention mounted in a shielding wall.

As shown in Fig. 1, the remote-control manipulator of the present invention comprises a horizontal support 50, a master arm 51, and a slave arm 52. The horizontal support 50 is generally horizontal and extends through a generally vertical shielding wall 53, being mounted therein on a sleeve or tube 54 set in the wall. The thickness of the wall and the material thereof will depend upon the shielding purpose of the wall. If the wall is to shield an operator of the manipulator from radioactive emanation, the wall must be constructed of radiation-absorbing material such as concrete and/or iron, and be relatively thick. If the wall is to shield the operator from bacteria or other similar noxious matter, the wall 53 may be relatively thin. The wall is provided with a window 55 which has the same thickness as the wall and may be formed of laminated glass plates. The master and slave arms 51 and 52 are generally vertical and are pivotally connected near or at their upper ends to the horizontal support 50 on opposite sides of the shielding wall 53, the master arm 51 being in a safe area to the right of the wall 53 as viewed in Fig. 1, and the slave arm 52 being to the left of the wall 53 as viewed in Fig. 1.

The master arm 51 comprises a stationary part 56 and a movable part 57, the stationary part being pivotally connected at 58 to the horizontal support, and the movable part 57 being mounted on the stationary part 56 so as to slide therealong toward and away from the pivot 58. Similarly, the slave arm 52 comprises the stationary part 59 and movable part 60, a stationary part being pivotally connected at 61 to the horizontal support 50, and the movable part 60 being mounted on the stationary part so as to be slidable therealong toward and away from the pivot 61. It should be noted that the stationary parts 56 and 59 of the master and slave arms 51 and 52 are not stationary in the strict sense of the word since they may move about their pivots 58 and 61 on the support 50, but the term "stationary" is used to contrast these parts with the movable parts, the stationary parts 56 and 59 being held against movement toward and away from the pivots 58 and 61, the movable parts 57 and 60 being, on the other hand, movable toward and away from these pivots. A handle 62 on the lower end of the movable part 57 of the master arm 51 is engaged by the hand of the operator and by appropriate movements transmitted along the arms 51 and 52, and the support 50 controls the movement of a grasper or claw 63 connected to the lower end of the movable part 60 of the slave arm 52.

It will be noted that the slave arm 52 does not project above the horizontal support 50 and so can be moved into a horizontal position in alignment with the support 50, as shown in dotted lines, when the manipulator is being installed or removed from the wall 53. Since the slave arm 52 does not project above the support 50, little or no headroom is required in the dangerous or contaminated area above the mounting tube 54. The master arm 51 projects only a small amount above the support 50, and so only a limited amount of headroom is required in the safe area above the mounting tube 54.

Attention is now directed to Figs. 4 to 8, which illustrate the connection of a master arm 51 to the horizontal support 50 on the pivot 58. As shown in Figs.

Figure 4:
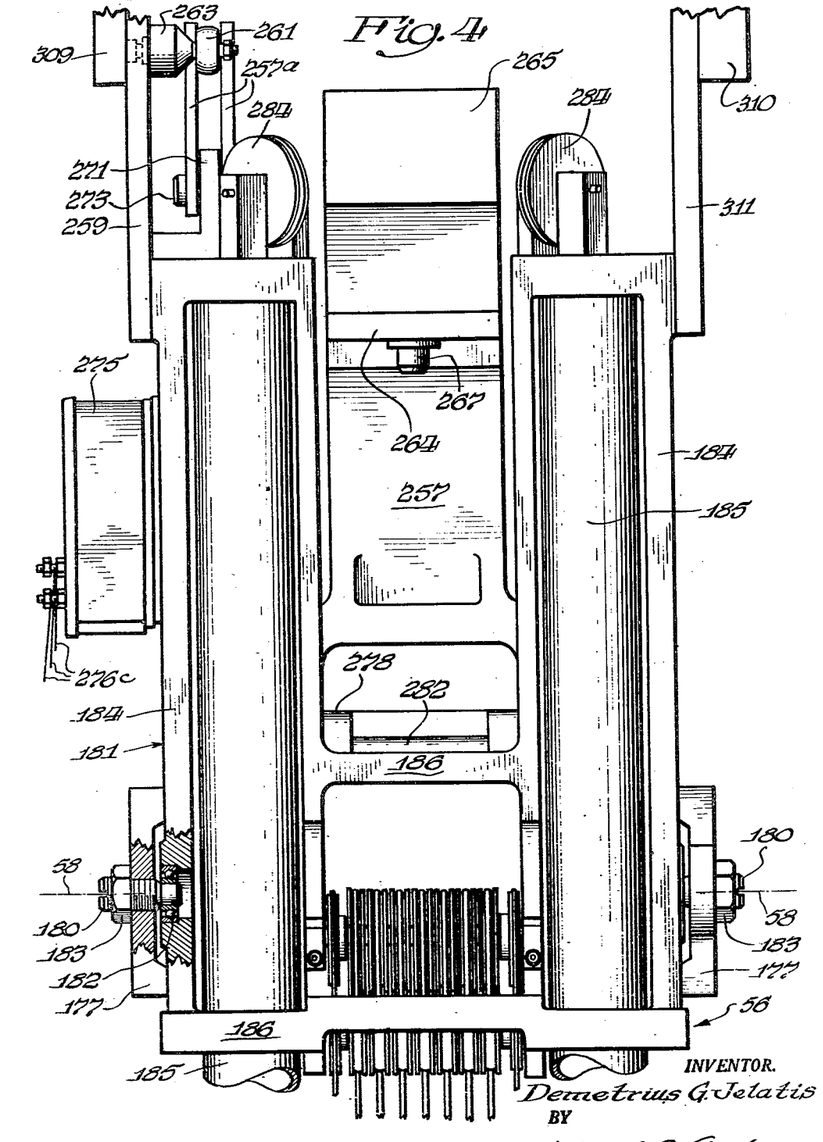
Fig. 4 is an end view showing the portion of the master arm within the area 4 in Fig. 2, more particularly, the upper end of the master arm.
Figure 5:
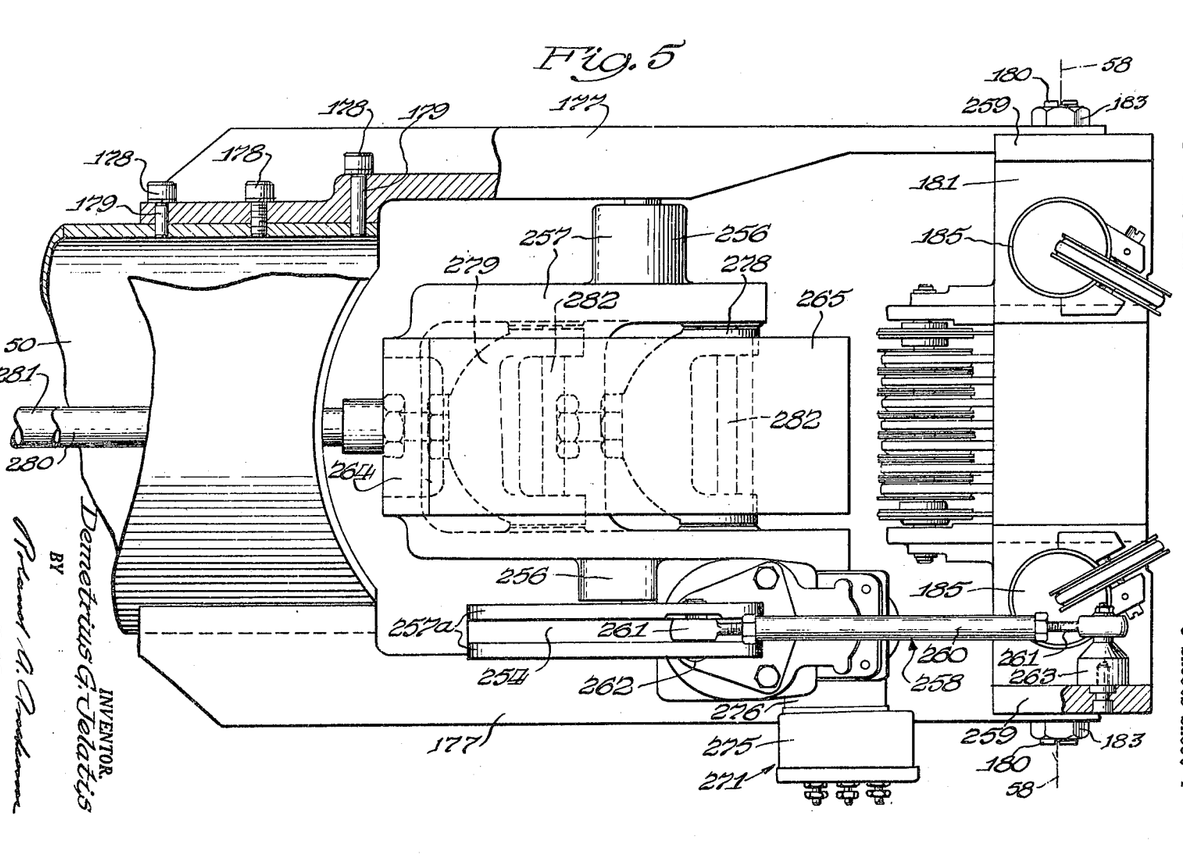
Fig. 5 is a plan view, with parts broken away, of the master arm, the adjacent end of the horizontal support, and mechanism adjustably interconnecting the master arm and the slave arm.
Figure 6:
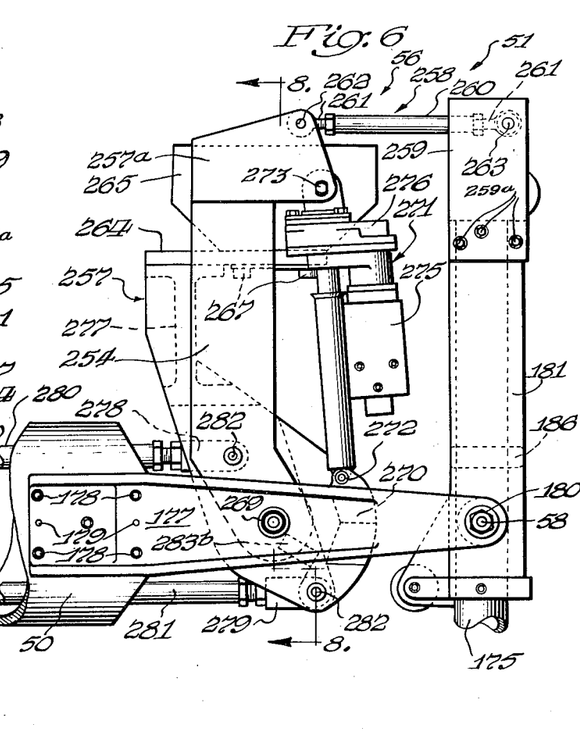
Fig. 6 is an elevational view showing the upper end of the master arm, the adjacent end of the support, and the said mechanism adjusted to hold the arms parallel.

5 and 6, a pair of legs 177 is attached to one end of the horizontal support 50 by means of two sets of five screws 178 and of two locating pins 179. The legs 177 project beyond the end of the horizontal support at 50 and carry threaded stub shafts 180 upon which a frame 181 is journaled by means of ball bearings 182, as illustrated in Fig. 4. The shafts 180 have their axes coincident with the pivot 58 of the master arm 51 on the horizontal support 50. Each shaft 180 has threaded engagement with one of the legs 177 and is held against movement therein by means of a jam nut 183. The frame 181 forms a part of the stationary part 56 of the master arm 51 and is generally in the shape of a U having open or hollow vertical legs 184, and a horizontal base formed of vertically spaced portions 186 which interconnect the legs 184. These legs receive and are clamped to the upper ends of vertical tubular guides 185, which also form part of the stationary part 56 of the master arm 51.

Figure 7:
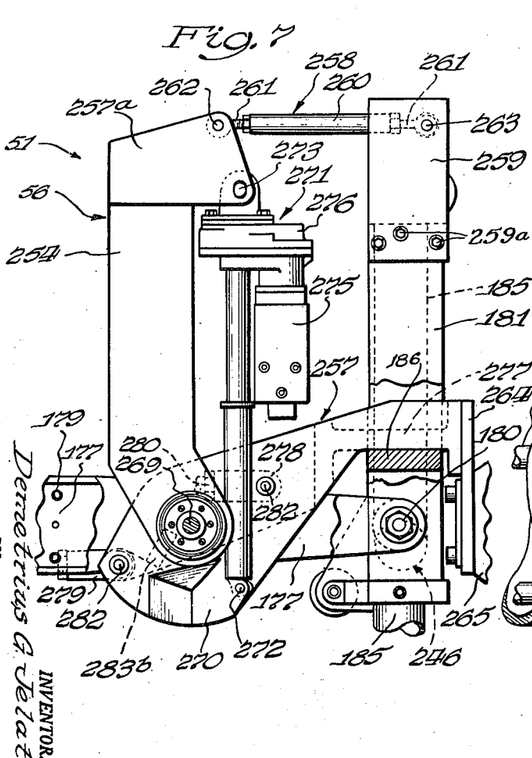
Fig. 7 is an elevational view similar to Fig. 6 but showing said mechanism adjusted to hold the arms at right angles to one another.
Figure 8:
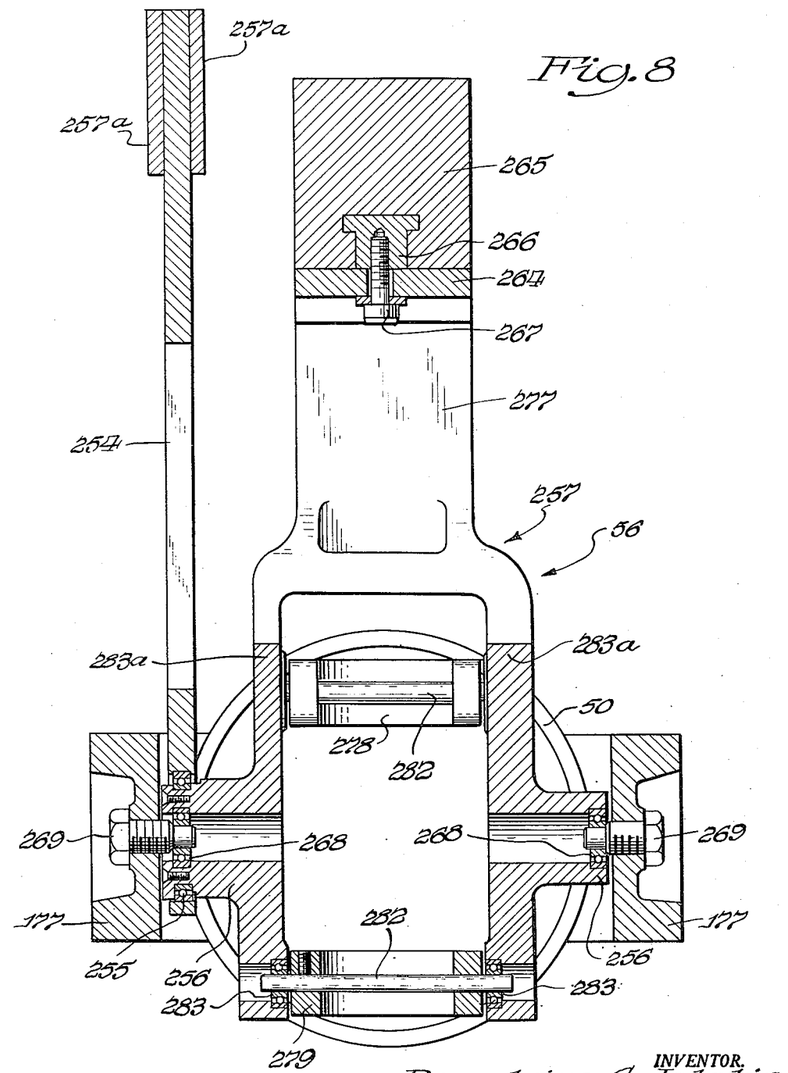
Fig. 8 is a vertical sectional view taken on the line 8—8 of Fig. 6 and showing the counterweight for the slave arm mounted adjacent the master arm.

As shown in Figs. 6, 7 and 8, a supplemental arm 254 is pivoted at its lower end by means of a ball bearing 255 on one of two hubs 256 of a bifurcated counterweight support 257. The upper end of the supplemental arm 254 is connected by means of ears 257a, an adjustable link 258, and an extension piece 259 with the upper end of the frame 181 on the master arm 51. The ears 257a are welded to opposite sides of the arm 254 and project therefrom in spaced relationship to one another toward the master arm 51. Extension piece 259 is secured by screws 259a to an upper portion of the frame 181 so as to project thereabove. The adjustable link 258 comprises a body member 260 and threaded eye members 261 which have adjustable threaded connections with the body member 260 so that the distance between the eyes of the members 261 can be varied to adjust the effective length of the adjustable link 258. The eye members 261 of the link 258 are pivotally connected to the ears 257a of the supplemental arm 254 by a pin 262 and to the extension piece 259 on the frame 181 by a post 263 secured to the extension piece. The support 257 has an upper flange 264 which directly carries a counterweight 265 which is attached to the flange 264 by means of nuts 266 embedded in the counterweight and bolts 267 going through the flange 264 and threaded into the nuts 266. The counterweight support 257 is pivotally carried on the legs 177 of the horizontal support 50 by means of ball bearings 268 and threaded stub shafts 269 which have threaded engagement with the legs 177. The counterweight support 257 has a lateral extension 270 at its lower end to which one end of a power-operated adjustor 271 is pivotally connected by a pin 272, the said end of the adjustor being relatively thin and being received in a slot in the extension 270. The upper end of the adjustor 271 is pivotally connected by a pin 273 to and between the ears 257a on the supplemental arm 254.

Figure 2:
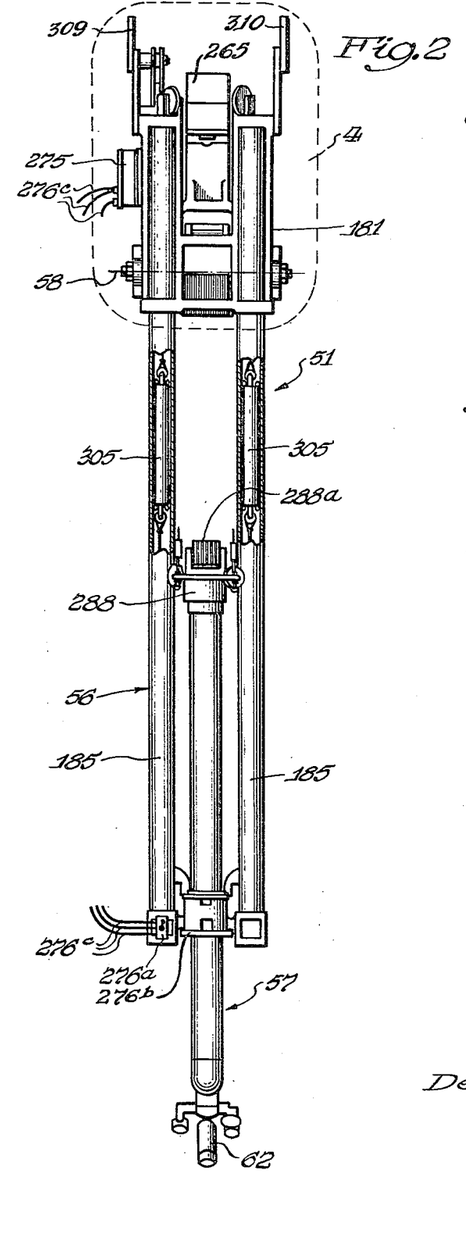
Fig. 2 is an elevational view, with parts broken away, of a master arm of the manipulator.

The power-operated adjustor 271 may comprise essentially a motor positioned within a housing behind a control box 275 for the motor, reduction gearing located in a box 276, a long rotatable nut driven by the motor through the reduction gearing, and a nonrotatable screw engaged by the nut. The adjustor 271 may also include a clutch that is automatically disengaged to break the driving connection between the motor and the nut when the motor is not being driven and a brake that automatically holds the nut against rotation when the clutch is disengaged. The adjustor 271 is operated from a switch 276a which, as shown in Fig. 2, is mounted on a bracket 276b at the lower ends of the tubular guides 185 and is connected with the control box 275 through a plurality of lines 276c. The adjustor 271 is operated to vary the distance between its connections 272 and 273 with the counterweight support 257 at the lower end and the supplemental arm 254 at the upper end, so that the counterweight 265 may be alongside the supplemental arm 254 as shown in Figs. 6 and 8, or may be lowered to the position of Fig. 7 in which it is located on the side of the master arm 51 away from the supplemental arm 254. In moving between the two positions depicted in Figs. 6 and 7, the counterweight 265 goes between the legs 184 of the frame 181 on the upper end of the master arm 51. The counterweight support 257 is specially shaped so that the counterweight 265 may go to the extreme position of Fig. 7; more particularly, the upper vertical part of the counterweight support 257 directly below the flange 264 comprises a web 277 which is sufficiently offset from the counterweight 265 as to permit the counterweight to move to a level between the upper and lower portions 186 of the base of the frame 181, while the web 277 moves into engagement with the upper member 186 of the frame base.

The counterweight support 257, which is a casting, is bifurcated so as to receive in pivotal connections upper and lower yokes 278 and 279 secured respectively to the ends of upper and lower links 280 and 281. The yokes 278 and 279 are connected with the counterweight support 257 in the manner illustrated for the yoke 279 in Fig. 8, namely, through a shaft 282 fixed to the yoke and ball bearings 283 journaling the ends of the shaft 282 in legs 283a of the bifurcated counterweight support 257. The support 257 includes a reinforcing cross brace 283b which is shown in Fig. 6 and interconnects the lower portions of the legs 283a. The links 280 and 281 extend from the yokes 278 and 279 adjacent the master arm 51 through and along the horizontal support 50 to the slave arm 52 where, as shown in Fig. 1, they are pivotally connected to the slave arm 52 above and below the pivot 61 of the slave arm 52 on the horizontal support 50.

When the master arm 51 is angularly shifted about its pivot 58, the slave arm 52 will follow the master arm in similar angular motion, because of the interconnection of the arms through the links 280 and 281, the counterweight support 257, the adjustor 271 acting as a link of fixed length between the pivots 272 and 273, the supplemental arm 254, and the link 258. When the slave arm 52 is to be angularly adjusted with respect to the master arm 51, the adjustor 271 is actuated to change the distance between the pivotal connections 272 and 273. This results in a shifting of the counterweight support 257 with respect to the supplemental arm 254 and the master arm 51, and the counterweight support 257 acts through the links 280 and 281 to shift the slave arm. It will be noted, of course, that the counterweight 265 shifts with its support 257 and with the slave arm 52, thus counterbalancing the movement of the slave arm with respect to the master arm.

The copending Goertz et al. application, Serial No. 501,008, filed April 12, 1955, contains a complete description of how the master arm 51 and the slave arm 52 are interconnected. Briefly, the master arm 51 and the slave arm 52 are interconnected, so that the motions of the handle 62 on the master arm are reproduced by the grasper 63 on the slave arm. Six motions of the handle 62 are reproduced by the grasper 63. They are opening and closing, movement along the master or slave arm toward the pivot on the horizontal support, two types of rotation of the handle or the grasper about the lower end of the master or slave arm, "azimuth" motion involving rotation of the handle or grasper about the axis of the master or slave arm, and bodily movement of the handle or grasper resulting from pivoting of the master or slave arm on the support. There is a seventh motion provided by angular movement of the horizontal support 50 in the tube 54. In addition, indexing is obtained by angular movement of the slave arm with respect to the master arm produced by actuation of the power-operated adjuster 271.

The master arm 51 comprises the stationary part 56 and the movable part 57 which shifts therealong toward and away from the pivot 58 between the master arm and the horizontal support 50, or more particularly, between the stationary part 56 and the horizontal support 50. It will be evident from Fig. 2 that the pivot 58 is much nearer the upper end of the stationary part 56 formed by the frame 181 than the lower end of the movable part formed by the bracket 276b. Thus for convenience of description, the upper end of the stationary part 56 is referred to as the near end and the lower end, as the distant end, and thus guide pulleys 284 (Figs. 4 and 12) which are mounted on the upper end of the frame 181 at the upper end of the stationary part 56 may be called the near outer guides or guide means, and guide pulleys 285 (Fig. 12) and guide pulleys 286 (Figs. 9 and 11), which are mounted at the lower end of the stationary part 56, may be called the distant outer guides or guide means. Guide pulleys 287 (Figs. 9–12) which are mounted on the stationary part 56 up the master arm near the pivot 58 are called inner guides or guide means. As is evident from Fig. 2, the movable part 57 of the master arm runs up and down the stationary part 56, with a head 288 at the top of the movable part 57 running between the pivot 58 and the lower end of the stationary part 56. Thus guide pulleys 288a (Figs. 9 and 11) which, as shown in Fig. 2, are mounted on the head 288 always lie between the inner guide means 287 and the distant outer guide means 286 and are called intermediate guide means. On the slave arm 52 pulleys 289 (Fig. 12), being adjacent the pivot 61 of the slave arm, are called inner guide means, and guide pulleys 290 (Fig. 12), being on the end of the stationary part 60 of the slave arm spaced from the pivot 61 of the slave arm, are called outer guide means.

Figure 9:
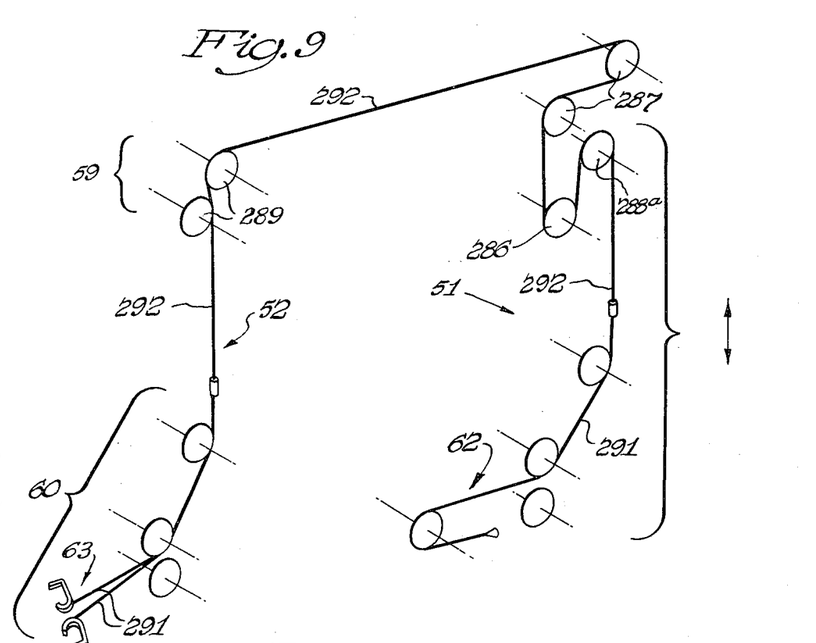
Fig. 9 is a diagrammatic perspective view showing how the opening and closing of the handle or gripper on the master arm causes opening and closing of the gripper on the slave arm.

As shown in Fig. 9, opening and closing of the handle 62 is transmitted through cables 291 and a tape 292 to produce opening and closing of the grasper 63.

Figure 10:
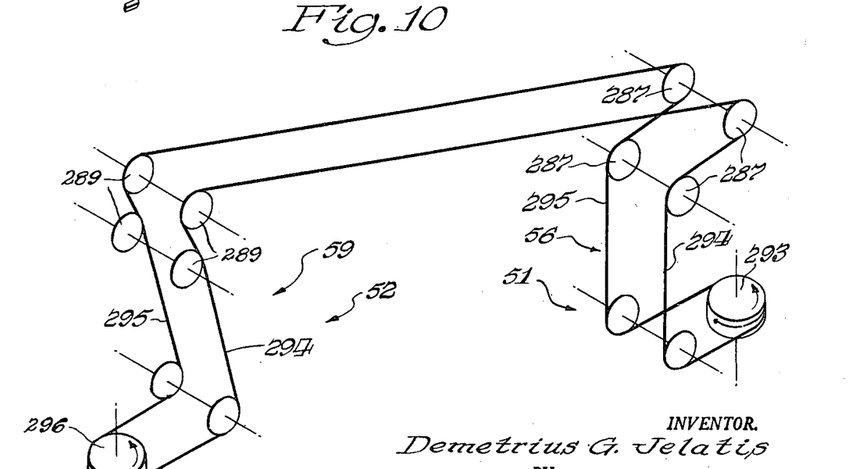
Fig. 10 is a diagrammatic perspective view showing how rotation of the master arm about a vertical axis produces rotation of the slave arm about a vertical axis.

As shown in Fig. 10, rotational movement of the handle 62 about the master arm 51 as an axis is transmitted through a rotatable ring 293, keyed to the movable part 56, cables 294 and 295, and a rotatable ring 296, keyed to the stationary part 59 of the slave arm 52, so that rotational movement of the grasper 63 about the axis of the slave arm 52 is produced.

Figure 11:
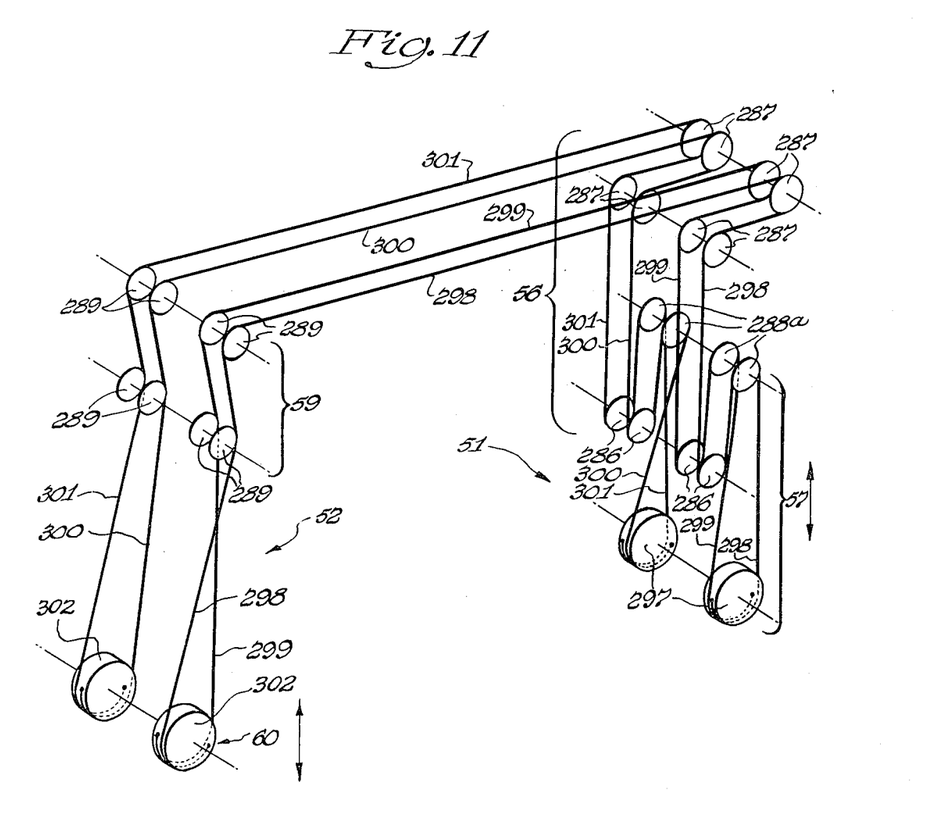
Fig. 11 is a diagrammatic perspective view illustrating how rotation of the handle about two axes in the base of the master arm produces rotation of the gripper about two axes in the base of the slave arm.

As shown in Fig. 11, two types of rotation of the handle 62 about the lower end of the master arm 51 causes rotation of take-up sections 297 on the master arm, which rotation is transmitted through tapes 298, 299, 300 and 301 to take-up sections 302 on the slave arm 52, which sections are caused to rotate and thus to produce rotation of the grasper 63 about the lower end of the slave arm corresponding to the rotation of the handle 62 about the lower end of the master arm. One type of rotation involves rotation of the take-up sections 297 in the same direction, and the other type, rotation thereof in opposite directions.

Figure 12:
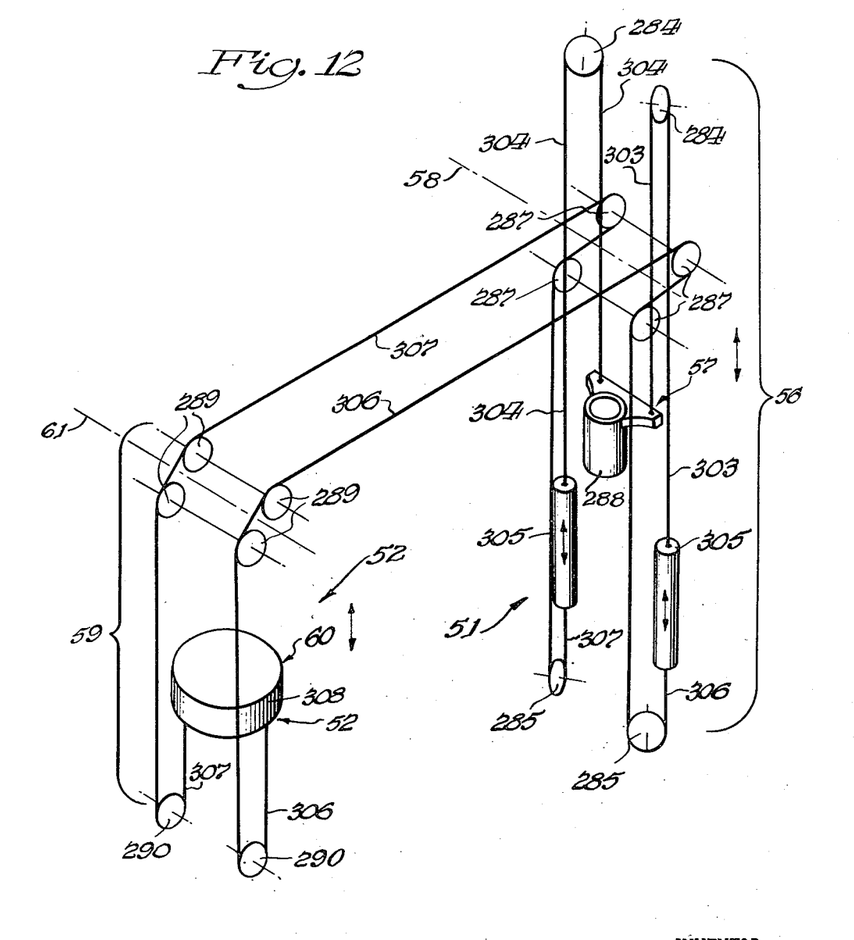
Fig. 12 is a diagrammatic perspective view illustrating how vertical movement of the master arm produces vertical movement of the slave arm.

Reference is now made to Fig. 12 for a showing of how the master and slave arms 51 and 52 are counterweighted and how they are interconnected for conjoint movement of the movable parts 57 and 60 along the stationary parts 56 and 59. If an operator transmits a downward movement to the movable part 57 of the master arm through the handle 62, the head 288 at the upper end of the movable part moves downward. Such downward movement of the head is transmitted through tapes 303 and 304 running over the near outer guide means 284 at the upper end of the stationary part 56 of the master arm to counterweights 305, which are caused to move upward to balance the downward movement of the movable part 57 of the master arm. As shown in Fig. 2, the counterweights 305 slide in the tubular guides 185. The upward movement of the counterweights 305 is transmitted to tapes 306 and 307, which run over the distant outer guide means 285 and the inner guide means 287 on the master arm and the inner guide means 289 and the outer guide means 290 on the slave arm to a head 308 on the movable part 60 of the slave arm. Consequently, the tapes 306 and 307 are pulled along the support 50 toward the master arm and pull the movable part 60 of the slave arm downward. When the operator moves the movable part 57 of the master arm upward, the counterweights 305 move downward under their own weight and permit the tapes 306 and 307 to move back toward the slave arm 52 and allow the movable part 60 of the slave arm to move upward. Since the tapes 306 and 307 are flexible, they, of course, will not push the movable part 60 of the slave arm upward. Instead such upward movement on the slave arm is produced by the tapes 298, 299, 300, and 301 and the take-up devices 297 and 302 in the manner shown in Fig. 11. When the movable part 57 on the master arm is moved upward, the intermediate guide means 288a mounted on the movable part 57 move upward away from the distant outer guide means 286 on the master arm. Increasing the spacing between the outer guide means 286 and the intermediate guide means 288a causes the tapes 298, 299, 300 and 301 to be pulled along the horizontal support 50 from the slave arm to the master arm, causing the take-up devices 302 and the movable part 60 of the slave arm, upon which they are mounted, to move upwards.

The master and slave arms 51 and 52 may be operated parallel to one another, as shown in Fig. 1, or the slave arm 52 may be angularly adjusted with respect to the master arm 51 by actuation of the power-operated adjustor 271 for a variety of purposes. When the manipulator is being installed, the slave arm is adjusted so as to be brought into alignment with the horizontal support 50 so that the slave arm may be inserted through the tube 54 and the shielding wall 53. Now the slave arm 52 is brought into parallelism with the master arm 51 or to some condition near parallelism. Since the master and slave arms are relatively long, some relatively small angular adjustment of the slave arm with respect to the master arm will change the distance between the handle 62 and the grasper 63 an appreciable amount, thus in effect causing the grasper 63 to move away from the handle 62 and farther into the dangerous area in which it operates or toward the handle and near the shielding wall 54. The provision for angular adjustment of the slave arm with respect to the master arm dispenses with a need for a more complicated construction of the horizontal support 50 that would involve adjustment of the length of the horizontal support or adjustment of the distance between the pivots 58 and 61 of the master and slave arms on a horizontal support.

Figure 3:
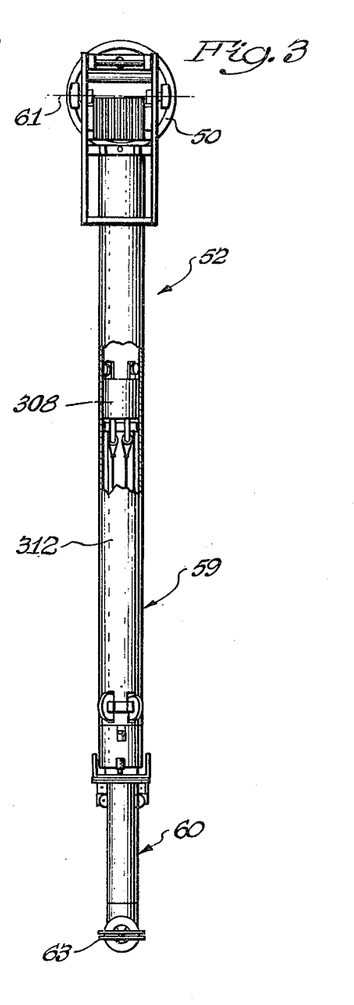
Fig. 3 is an elevational view, with parts broken away, of a slave arm of the manipulator.

The two counterweights 305 which move up and down as the movable parts 57 and 60 of the master and slave arms move down and up counterbalance both arms, even though the two counterweights are located on the master arm, more particularly in the tubular guides 185 of the stationary part 56 of the master arm (Fig. 2). The stationary parts 56 and 59 of the master and slave arms are counterbalanced by counterweights 265, 309, and 310 located at the upper or near end of the master arm 51, as shown in Fig. 2. As shown in Fig. 4, the counterweight 309 is secured to the extension 259, and the counterweight 310 is secured to an extension 311 which is located on the opposite side of the master arm and secured to one leg 184 of the frame 181. The counterweight 309 is relatively thin and thus relatively light while the counterweight 310 is relatively thick and thus relatively heavy so that a lateral balance is achieved in spite of the imbalance that would otherwise be imposed by the linear adjustor 271, the supplemental arm 254, and the link 260 connecting the supplemental arm and the upper end of the master arm 51. Angular movement of the slave arm with respect to the master arm does not appreciably disturb balance, because of the counterweight 265, which pivots along with the slave arm 51 when the latter is caused by the adjustor 271 to pivot with respect to the master arm 51. Counterweight 265 is also located adjacent the master arm 51. Thus there are no counterweights on the slave arm 52, and the construction can be relatively simple and take up little space; thus as shown in Fig. 3, the slave arm comprises, except at its ends, a single tubular guide 312 and the movable part 60 which slides within it. This is in contrast with the master arm 51 which, as shown in Fig. 2, comprises two spaced tubular guides 185 in which the counterweights 305 move up and down and the movable part 57 running between the tubular guides 185. Moreover, the slave arm 52 is somewhat simpler than the master arm 51 in that no portion of the slave arm extends above the horizontal support 50. Thus the slave arm 52 is as narrow as the horizontal support 50 and can be pivoted into alignment with it so as to be capable of being inserted through the tube 54 mounting the horizontal support 50 in the shielding wall 53 for installation of the manipulator as a complete assembly entirely from the side of the shielding wall 53 on which the master arm is to operate.

As is evident from the drawings, only a small portion of the master arm 51 projects above its pivot axis, and thus only a small amount of headroom is required to accommodate the master arm. The arrangement involving the small portion of the master arm above its pivot axis is made possible by the use of movable counterweights 305 and stationary counterweights 309 and 310. The movable counterweights 305 are, of course, required to balance the movable parts 57 and 60 of the master and slave arms. The counterweights 310 and 311, being stationary, can be and are made comparatively large and thus are placed comparatively near the pivot axis 58 of the master arm, and so the portion of the master arm that projects above the pivot axis and carries the stationary counterweights 309 and 310 is relatively short.

The intention is to limit the invention only within the scope of the appended claims.

What is claimed is:

1. A remote-control manipulator comprising a horizontal support, master and slave arms connected to the support at regions spaced lengthwise thereof for pivoting with respect to the support, a handle and a grasper connected with the master and slave arms, respectively, tie means interconnecting the handle and the grasper for causing movements of the handle to be reproduced by the grasper, link means interconnecting the arms for causing the arms to pivot conjointly with respect to the support, means for adjusting the link means to vary the angular relationship between the arms for adjusting the spacing between the handle and the grasper and to enable the slave arm to be angularly shifted into alignment with the support for installation and removal of the manipulator, and a special counterweight for the slave arm located adjacent the connection of the master arm and the support and being connected with the slave arm so as to move conjointly therewith during angular shifting of the slave arm with respect to the master arm.

2. The manipulator specified in claim 1, the link means interconnecting the master and slave arms including a supplemental arm connected to the support adjacent and generally parallel to the master arm, the means for adjusting the link means being connected to the supplemental arm and extending generally parallel thereto.

3. The manipulator specified in claim 2 and further including a support for the counterweight pivotally mounted on the horizontal support on the same axis as the supplemental arm.

4. The manipulator specified in claim 3, the handle and grasper being carried by the lower ends of the master arm and the slave arm, respectively, the upper end of the master arm comprising portions spaced from one another so as to provide room for the counterweight when the slave arm is shifted into alignment with the horizontal support.

5. The remote-control manipulator specified in claim 1, said master arm comprising a stationary part having a pivotal connection with the support relatively close to a near end of the part and relatively far from a distant end of the part, said stationary part including a pair of spaced parallel tubular guides, fixed counterweights for the master and slave arms secured to the tubular guides at the near end of the stationary part, a movable part mounted on the stationary part between the tubular guides for movement therealong toward and away from the pivotal connection of the stationary part with the support, the movable part having an inner end remaining between the pivotal connection and the distant end of the stationary part and an outer end remaining farther from the pivotal connection than the distant end of the stationary part and carrying a handle, movable counterweights for the master and slave arms positioned in the tubular guides for movement therealong between the pivotal connection and the distant end, tie means interconnecting the movable counterweights and the inner end of the movable part, and a pair of guides carried by the near end of the stationary part on the tubular guides, the tie means going in one direction from the upper end of the movable part to and over the guides, thence in the opposite direction to the movable counterweights, and thence in the said opposite direction into the tubular guides to the movable counterweights, the special counterweight moving into the space between the tubular guides when the slave arm moves into alignment with the horizontal support.

6. A master arm for a remote-control manipulator that also has a slave arm and a support for the arms, said master arm comprising a stationary part having a pivotal connection with the support relatively close to a near end of the part and relatively far from a distant end of the part, fixed counterweights for the master and slave arms secured to the near end of the stationary part, a movable part mounted on the stationary part for movement therealong toward and away from the pivotal connection of the stationary part with the support, the movable part having an inner end remaining between the pivotal connection and the distant end of the stationary part and an outer end remaining farther from the pivotal connection than the distant end of the stationary part and carrying a handle, movable counterweights for the master and slave arms mounted on the stationary part for movement therealong between the pivotal connection and the distant end, tie means interconnecting the movable counterweights and the inner end of the movable part, and a guide carried by the near end of the stationary part, the tie means going in one direction from the upper end of the movable part to and over the guide and thence in the opposite direction to the movable counterweights.

References Cited in the file of this patent

UNITED STATES PATENTS 2,476,249 Payne ______________ July 12, 1949